(12) United States Patent
Yanagida et al.

(10) Patent No.: US 10,060,537 B2
(45) Date of Patent: Aug. 28, 2018

(54) FLUID CONTROLLER

(71) Applicant: FUJIKIN INCORPORATED, Osaka-shi (JP)

(72) Inventors: Yasumasa Yanagida, Osaka (JP); Michio Yamaji, Osaka (JP); Tadayuki Yakushijin, Osaka (JP); Keisuke Ishibashi, Osaka (JP); Tsuyoshi Tanikawa, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 0 days.

(21) Appl. No.: 15/502,850

(22) PCT Filed: Dec. 14, 2015

(86) PCT No.: PCT/JP2015/084879
§ 371 (c)(1),
(2) Date: Feb. 9, 2017

(87) PCT Pub. No.: WO2016/104202
PCT Pub. Date: Jun. 30, 2016

(65) Prior Publication Data
US 2017/0234439 A1 Aug. 17, 2017

(30) Foreign Application Priority Data
Dec. 25, 2014 (JP) ................. 2014-262529

(51) Int. Cl.
*F16K 31/12* (2006.01)
*F16K 1/52* (2006.01)
*F16K 31/122* (2006.01)

(52) U.S. Cl.
CPC ............ *F16K 1/523* (2013.01); *F16K 31/122* (2013.01)

(58) Field of Classification Search
CPC ....... F16K 1/523; F16K 31/122; F16K 31/508
(Continued)

(56) References Cited

U.S. PATENT DOCUMENTS 5,439,197 A 8/1995 Itoi et al.
7,823,859 B2 * 11/2010 Ejiri ..................... F16K 7/14
251/285

(Continued)

FOREIGN PATENT DOCUMENTS

JP  07-083338 A    3/1995
JP  3020501 U     2/1996
JP  2003-014155 A  1/2003

OTHER PUBLICATIONS

International Search Report dated Mar. 15, 2016, issued for PCT/JP2015/084879.

*Primary Examiner* — Matthew W Jellett
(74) *Attorney, Agent, or Firm* — Locke Lord LLP

(57) ABSTRACT

Provided is a fluid controller in which reduction of the accuracy caused by the loosening of a screw portion and reduction of the durability caused by torsional stress are prevented. A stem vertical-movement-amount adjustment means 11 is provided with: a handle 41 which has a female screw 41b on an inner periphery thereof and which is rotatably supported by a casing 4; a movable body 42 in which a male screw 46b is provided on an outer periphery thereof and is screwed into the inner periphery of the handle 41; and a guide means 43 which prevents rotation of the movable body 42 relative to the casing 4 and which enables vertical movement of the movable body 42.

6 Claims, 3 Drawing Sheets

(58) Field of Classification Search
USPC .......... 251/63.5, 63.6, 92, 93, 266–271, 285
See application file for complete search history.

(56) References Cited

U.S. PATENT DOCUMENTS

| | | | |
|---|---|---|---|
| 8,141,582 B2* | 3/2012 | Fukano | ..................... F16K 7/16 |
| | | | 116/277 |
| 2013/0142675 A1* | 6/2013 | Nabei | ................... F16K 31/046 |
| | | | 417/271 |

* cited by examiner

FLUID CONTROLLER

CROSS REFERENCE TO RELATED APPLICATIONS

This application is related to co-pending application: "FLUID CONTROLLER" filed even date herewith in the names of Tsuyoshi TANIKAWA; Michio YAMAJI; Tadayuki YAKUSHIJIN; Keisuke ISHIBASHI and Yasumasa YANAGIDA as a national phase entry of PCT/JP2015/084880, which application is assigned to the assignee of the present application and is incorporated by reference herein.

TECHNICAL FIELD

The present invention relates to fluid controllers and, in particular, to a fluid controller suitable to be used for adjusting a flow rate by restricting a vertical movement amount of a stem in association with opening and closing operations.

BACKGROUND ART

A fluid controller which is suitable to be used for adjusting a flow rate by restricting a vertical movement amount of a stem in association with opening and closing operations is known. Such a fluid controller includes a body provided with a fluid channel, a casing provided above the body, a valve body which opens and closes the fluid channel, a stem which moves upward or downward to move the valve body in an open or close direction, an actuator which causes the stem to move vertically; and a stem vertical-movement-amount adjustment means which adjusts a vertical movement amount of the stem in association with the opening and closing of the fluid channel (Patent Literature 1).

In the fluid controller according to the Patent Literature 1, the stem vertical-movement-amount adjustment means is configured in such a manner that a female screw portion of the handle is screwed to a male screw portion provided on the casing of the actuator and that rotating the handle to adjust the position of a stopper causes the vertical movement amount of the stem in association with the opening and closing of the fluid channel to be adjusted.

CITATION LIST

Patent Literature

Patent Literature 1: Japanese Unexamined Patent Application Publication No. 2003-14155

SUMMARY OF INVENTION

Technical Problem

According to the fluid controller of the above-mentioned Patent Literature 1, a screw portion of the handle and a screw portion provided on a housing main body of the air cylinder are screwed together and rotated in relation to each other, whereby the position of the stopper is adjusted. Accordingly, a force in the rotational direction caused by the screwing and the rotation is applied to component members of the fluid controller, such as the stopper, stem, bellows and other members. Therefore, there are possibilities of the loosening of the screw portion and the generation of the torsional stress which affects the component members. As a result, there are potential problems of reduction of the accuracy caused by the loosening of the screw portion, reduction of the durability caused by the torsional stress, and breakage.

An object of the present invention is to provide a fluid controller in which reduction of the accuracy caused by the loosening of the screw portion and reduction of the durability caused by the torsional stress are prevented.

Solution to Problem

The fluid controller in accordance with the present invention is a fluid controller comprising: a body provided with a fluid channel; a casing provided above the body; a valve body which opens and closes the fluid channel; a stem which moves upward or downward to move the valve body in an open or close direction; an actuator which causes the stem to move vertically; and a stem vertical-movement-amount adjustment means which adjusts a vertical movement amount of the stem in association with the opening and closing of the fluid channel, wherein the stem vertical-movement-amount adjustment means comprises a handle rotatably supported by the casing, a movable body screwed into an inner periphery of the handle, and a guide means which prevents the movable body from rotating in relation to the casing and which enables vertical movement of the movable body.

In this stem vertical-movement-amount adjustment means, rotation of the handle is converted into vertical movement of the movable body, whereby the vertical movement amount is adjusted. In contrast, in a case of rotating the handle to cause the movable body to vertically move while rotating integrally with the handle, there is a possibility of loosening of the screw portion due to the rotation and a possibility of breakage due to generation of torsional stress applied on bellows or other parts. In the present invention, there are no such possibilities and reduction of the accuracy caused by the loosening of the screw portion, reduction of the durability caused by the torsional stress, and breakage are prevented.

In some cases, the stem vertical-movement-amount adjustment means is further provided with a movable body fixing means which blocks movement of the movable body after the stem vertical movement amount is set. The movable body fixing means is, for example, one or more setscrews.

In some cases, an upper end portion of an actuator drive shaft which is integral with the stem is inserted through a shaft insertion hole of the movable body, a flange portion is provided at a portion, of the drive shaft, which is located below the shaft insertion hole, and a distance between an upper surface of the flange portion of the drive shaft and a lower surface of the movable body is defined as a stem vertical movement amount.

In some cases, the guide means has a guide groove which is provided on the movable body and which extends vertically; and a guide pin which is fixed to the casing and which has a distal end portion fitted into the guide groove.

It is preferable that a handle pressing ring fixed to the casing is further included and that the handle pressing ring is received by a flange provided at the handle via a friction reducing member.

The fluid controller is, for example, a metal diaphragm valve, but is not limited thereto. Also, the fluid controller may be normally in a closed state or may be normally in an open state.

Advantageous Effects of Invention

In accordance with the fluid controller of the present invention, converting the rotational movement of the handle into the vertical movement of the disc prevents reduction of the accuracy caused by the loosening of the screw portion and reduction of the durability caused by the torsional stress.

Figure 1:
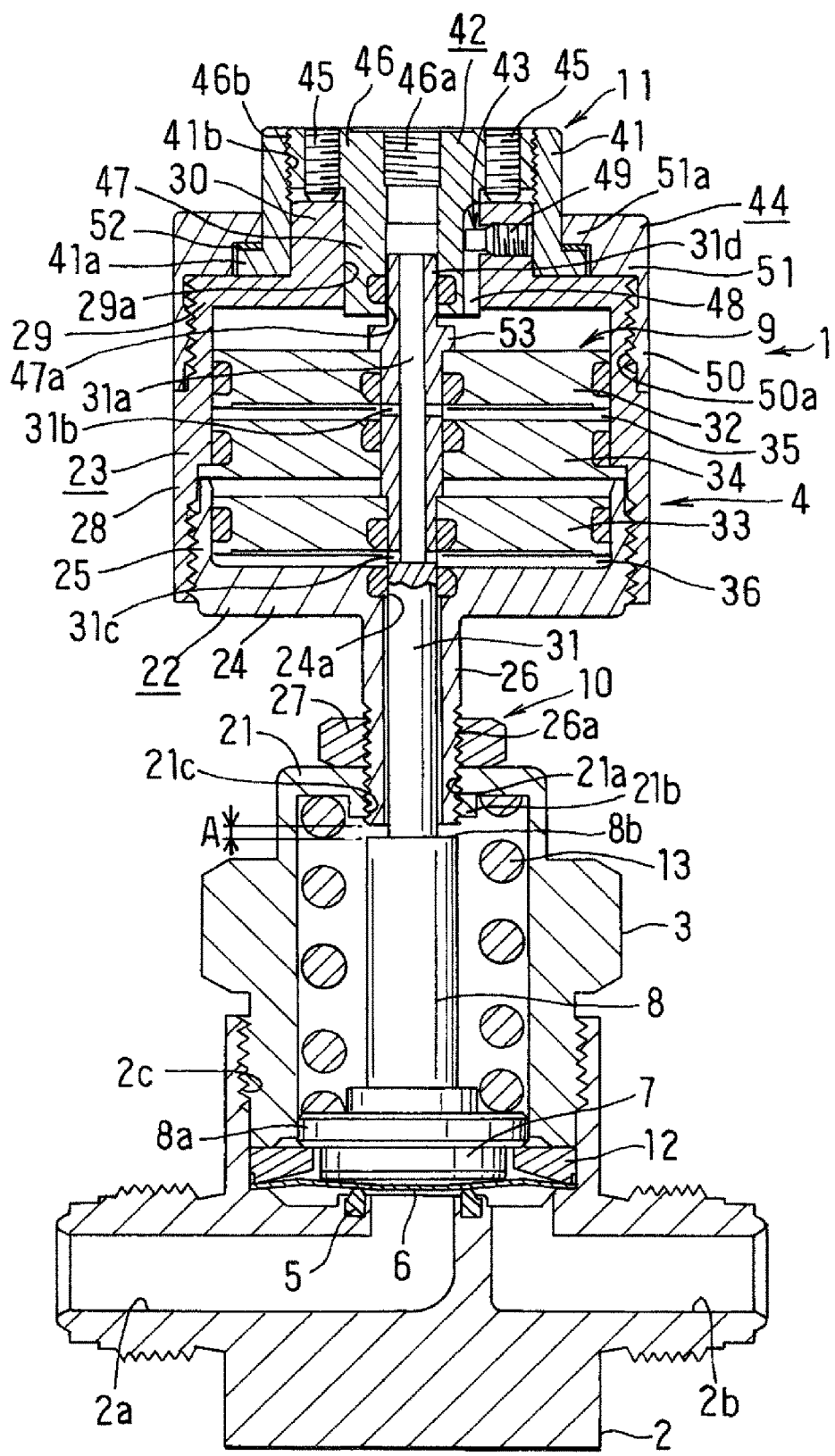
FIG. 1 is a vertical cross-sectional view of a fluid controller according to a first embodiment of the present invention.

REFERENCE SIGNS LIST (1): fluid controller, (2): body, (2a): fluid inflow channel, (2b): fluid outflow channel, (2c): depression, (4): casing, (6): diaphragm (valve body), (8): stem, (9): actuator, (10): vertical-movement-amount upper-limit-value setting means, (11): stem vertical-movement-amount adjustment means, (31): drive shaft, (31d): upper end portion, (41): handle, (41b): female screw portion, (42): movable body, (43): guide means, (44): handle pressing ring, (46b): male screw portion, (47a): through hole (shaft insertion hole), (48): guide groove, (49): guide pin, (53): flange portion, (52): washer (friction reducing member)

DESCRIPTION OF EMBODIMENTS

Embodiments of the present invention will now be described with reference to the drawings. In the following description, the "upper" and "lower" sides in the drawings will be referred to as "upper" and "lower", respectively.

Figure 2:
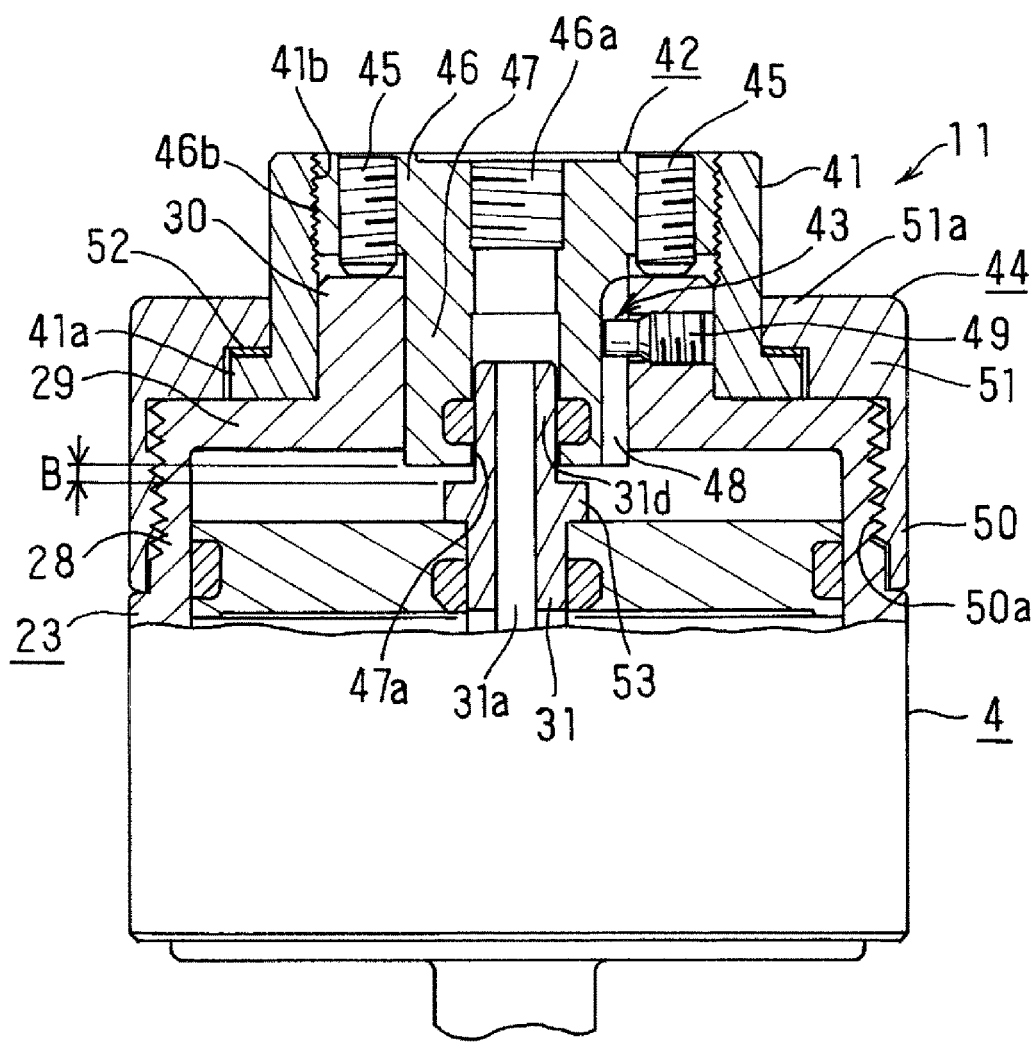
FIG. 2 is an enlarged vertical cross-sectional view of a stem vertical-movement-amount adjustment means, which is an essential component of FIG. 1.
Figure 3:
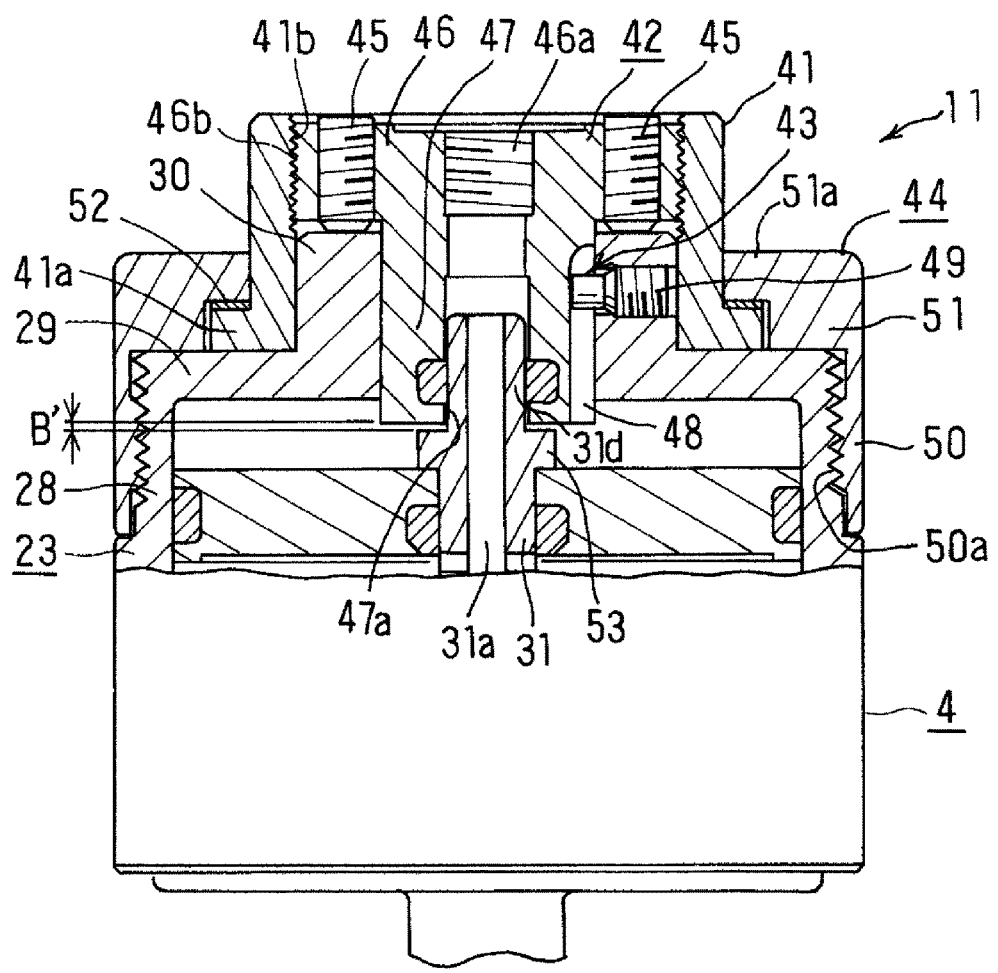
FIG. 3 is an enlarged vertical cross-sectional view showing a state in which a stem vertical movement amount is changed by the stem vertical-movement-amount adjustment means from the state shown in FIG. 2.

FIG. 1 to FIG. 3 show a fluid controller according to a first embodiment of the present invention.

A fluid controller (1) is referred to as a direct touch-type metal diaphragm valve. As shown in FIG. 1, the fluid controller (1) is provided with: a block-shaped body (2) having a fluid inflow channel (2a), a fluid outflow channel (2b), and a depression (2c) opening upward; a cylindrical bonnet (3) having a lower end portion which is screwed into an upper portion of the depression (2c) of the body (2); a casing (4) provided above the bonnet (3); an annular synthetic resin seat (5) provided on a peripheral edge of the fluid inflow channel (2a); a metal diaphragm (valve body) (6) which is pressed against or separated from the seat (5) to open or close the fluid inflow channel (2a), respectively; a stem (8) which presses the diaphragm (6) against the seat (5) and separates the diaphragm (6) from the seat (5) via a diaphragm presser (7); an actuator (9) which is housed in the casing (4) and which causes the stem (8) to move vertically; a stem vertical-movement-amount upper-limit-value setting means (10) which sets an upper limit value of a stem vertical movement amount; and a stem vertical-movement-amount adjustment means (11) which changes the stem vertical movement amount within a range of not greater than the upper limit value.

The bonnet (3) has a top wall (21) in which a through hole (21a) through which the stem (8) is inserted in a vertically movable manner is provided in a center portion of the top wall (21). At a peripheral edge portion of the through hole (21a), a cylindrical downward protruding edge portion (21b) which protrudes downward is provided. On the inner periphery of the through hole (21a) and the downward protruding edge portion (21b), a female screw (21c) is provided.

The casing (4) consists of a lower casing portion (22) and an upper casing portion (23) having a lower end portion which is screwed to the lower casing portion (22).

The lower casing portion (22) has: a bottom wall (24) in which a through hole (24a) through which the stem (8) is inserted in a vertically movable manner is provided in a center portion of the bottom wall (24); and a cylindrical surrounding wall (25). At a peripheral edge portion of the through hole (24a), a cylindrical downward protruding portion (26) which protrudes downward is provided. On an outer periphery of a lower portion of the downward protruding portion (26), a male screw portion (26a) is provided. To an upper portion of the male screw portion (26a), a lock nut (27) is screwed. A lower portion of the male screw portion (26a) is screwed into a female screw (21c) provided on the top wall (21) of the bonnet (3).

The upper casing portion (23) has a cylindrical surrounding wall (28) and a top wall (29). At the center portion of the top wall (29), a through hole (29a) is provided. At the peripheral edge portion of the through hole (29a), a cylindrical upward protruding portion (30) which protrudes upward is provided.

Between a lower end surface of the bonnet (3) and a bottom surface of the depression (2c) of the body (2), a pressing adapter (12) is placed. An outer peripheral edge portion of the diaphragm (6) is held between the pressing adapter (12) and the bottom surface of the depression (2c) of the body (2).

The diaphragm (6) has the shape of a spherical shell in a natural state, which has an arc shape curving upward. The diaphragm (6) is for example made of a nickel alloy thin sheet, is cut out into the shape of a circle, and is formed into a spherical shell having the center portion bulging upward. In some cases, the diaphragm (6) is made of a stainless steel thin sheet, and is made of a layered product formed of a stainless steel thin sheet and a nickel-cobalt alloy thin sheet.

A flange (8a) is provided near a lower end of the stem (8). Between the flange (8a) and an outer peripheral edge portion of the top wall (21) of the bonnet (3), a compression coil spring (biasing member) (13) which biases the stem (8) downward is placed. The compression coil spring (13) maintains the fluid controller (1) in a closed state in the normal condition (when the actuator (9) is not operated).

The actuator (9) has: a drive shaft (31) having a lower end portion which is screwed to an upper end portion of the stem (8) whereby the drive shaft (31) is fixed to the stem (8); slidable upper and lower pistons (32), (33) each having an outer peripheral surface which is in close contact with an inner peripheral surface of the casing (4) and each having an inner peripheral surface which is in close contact with an outer peripheral surface of the drive shaft (31); and a counter plate (34) positioned between the upper and lower pistons (32), (33). Operational air introduction chambers (35), (36) are below the upper and lower pistons (32), (33), respectively. The drive shaft (31) is provided with an axial channel (31a) and radial channels (31b), (31c) for sending operational air into the operational air introduction chambers (35), (36).

The outer diameter of the stem (8) is larger than that of the drive shaft (31). An upper end surface (8b) of the stem (8) is protruding beyond the outer diameter of the drive shaft (31) radially outward. The dimensions (vertical length and the like) of the stem (8) is set in such a manner that stem vertical movement amount A may be provided between the upper end surface (8b) of the stem (8) and a lower surface of the downward protruding portion (26) of the lower casing portion (22).

When the stem (8) moves upward, the upper end surface (8b) of the stem (8) contacts the lower surface of the downward protruding portion (26) of the lower casing portion (22), whereby the further movement of the stem (8) upward is blocked. In the state where the lock nut (27) is loosen, the lower casing portion (22) is rotated, whereby stem vertical movement amount A, that is, an upper limit value of an upward movement amount of the stem (8) may be set to a required value. The downward protruding portion (26) of the casing where the male screw portion (26a) is provided, the female screw (21c) provided on the top wall (21) of the bonnet (3), and the lock nut (27) constitute the stem vertical-movement-amount upper-limit-value setting means (10) which sets the upper limit value of stem vertical movement amount A.

As the upper limit value of stem vertical movement amount A, a value with which a required durability may be secured is set. Here, stem vertical movement amount A has a correlation to a flow rate (Cv value). Therefore, in order to obtain a desired Cv value, changing stem vertical movement amount A is necessary. By changing stem vertical movement amount A obtained by the stem vertical-movement-amount upper-limit-value setting means (10), the Cv value may be adjusted. In this case, the durability also changes. Therefore, in order to enable the change of the stem vertical movement amount for obtaining the desired Cv value without changing stem vertical movement amount A obtained by the stem vertical-movement-amount upper-limit-value setting means (10), the stem vertical-movement-amount adjustment means (11) is used.

As also shown in FIG. 2 and FIG. 3, the stem vertical-movement-amount adjustment means (11) is provided with: a cylindrical handle (41); a cylindrical movable body (42) which is moved vertically in association with rotation of the handle (41); a guide means (43) which prevents the movable body (42) from rotating in relation to the casing (4) and which enables the movable body (42) to move vertically; a handle pressing ring (44) which causes the casing (4) to support the handle (41) rotatably; and one or more (two in the drawings) setscrews (45) (movable body fixing means) which block the movement of the movable body (42) after the stem vertical movement amount is set.

The handle (41) has a flange portion (41a) at the lower end portion. The handle (41) is provided on an inner periphery of an upper portion thereof with a female screw portion (41b). The handle (41) has a lower portion which is fitted to an outer periphery of an upward protruding portion (30) of the upper casing portion (23) with a slight gap interposed therebetween. The handle (41) has a lower end which is received on an upper surface of the top wall (29) of the upper casing portion (23).

The movable body (42) consists of an upper large-diameter portion (46) and a lower small-diameter portion (47) having the same inner diameter as that of the large-diameter portion (46) and having a smaller outer diameter than that of the large-diameter portion (46). A lower surface of the large-diameter portion (46) is received on an upper surface of the upward protruding portion (30) of the upper casing portion (23).

On the inner periphery of the large-diameter portion (46), a pipe connection portion (46a) for introducing operational air is provided. On the outer periphery of the large-diameter portion (46), a male screw portion (46b) which is screwed into the female screw portion (41b) of the handle (41) is provided. The large-diameter portion (46) is provided with two screw holes which penetrate therethrough vertically. Into each screw holes, a setscrew (45) as a movable body fixing means is screwed.

On an inner periphery of the small-diameter portion (47), a through hole (shaft insertion hole) (47a) into which an upper end portion (31d) of the drive shaft (31) is inserted is provided so as to be contiguous to the pipe connection portion (46a). On an outer periphery of the small-diameter portion (47), a guide groove (48) extending vertically is provided.

On the upward protruding portion (30) of the upper casing portion (23), a guide pin (49) having an axis which extends in a direction perpendicular to the vertical direction is provided so as to face the guide groove (48) from the radially outer side. On an outer periphery of the guide pin (49) except for a distal end portion thereof, a male screw is provided. The male screw is screwed into a screw hole provided in the upward protruding portion (30) of the upper casing portion (23) whereby the guide pin (49) is fixed to the upper casing portion (23). The distal end portion of the guide pin (49) is fitted into the guide groove (48) whereby the movable body (42) is not capable of rotating in relation to the upper casing portion (23) and is capable of moving vertically in relation to the upper casing portion (23). As described above, the guide groove (48) and the guide pin (49) constitute the guide means (44) which prevents the movable body (42) from rotating in relation to the casing (4) and which enables the movable body (42) to move vertically.

The handle pressing ring (44) consist of a lower thin portion (50) and an upper thick portion (51) having an outer diameter which is the same as that of the thin portion (50) and having an inner diameter which is smaller than that of the thin portion (50). On the inner periphery of the thin portion (50), a female screw (50a) is provided. At an upper end portion of the thick portion (51), an annular projecting edge portion (51a) which projects radially inward is provided. The handle pressing ring (44) is screwed to the surrounding wall (28) of the upper casing portion (23). A lower surface of the thick portion (51) is received on the upper surface of the top wall (29) of the upper casing portion (23).

In an open state (a state of being pressurized with operational air) of the fluid controller (1), it becomes harder to perform an operation of the handle (41). But, by the provision of the fluororesin coating washer (52), operability in the open state is improved. Materials for the fluororesin coating may be resins such a PPS and the like. Alternatively, the washer may be made of metal (SUS, aluminum, iron, and the like). In addition, a friction reducing member such as a thrust bearing may be used instead of using the washer (52). Further, a structure in which frictional coefficient is reduced may be obtained by using a ball bearing and the like.

In the open state (the state of being pressurized with operational air) of the fluid controller (1), it becomes harder to perform the handle (41) operation. But, by the provision of the fluororesin coating washer (52), operability in the open state is improved.

In a state shown in FIG. 1 and FIG. 2, into each screw hole of the large-diameter portion (46) of the movable body (42), a setscrew (45) is screwed. Each setscrew (45) has a lower end which is in contact with the upper surface of the upward protruding portion (30) of the upper casing portion (23). Therefore, the vertical movement of the movable body (42) is blocked. By loosening each setscrew (45), the movable body (42) becomes capable of moving vertically.

In the state where the upper end portion (31d) of the drive shaft (31) is inserted into the through hole (47a) provided on the inner periphery of the small-diameter portion (47) of the movable body (42), a flange portion (53) is provided in the vicinity of the upper end portion (31d) of the drive shaft (31), that is, at a portion of the drive shaft (31) which is positioned below the through hole (47a). With this configuration, between an upper surface of the flange portion (53) of the drive shaft (31) and a lower surface of the small-diameter portion (47) of the movable body (42), a stem vertical movement amount shown by "B" in FIG. 2 (a stem vertical movement amount which is set at a different value and at a location different from that shown by "A" in FIG. 1) is set.

When the stem (8) moves upward, the upper surface of the flange portion (53) of the drive shaft (31) comes into contact with the lower surface of the small-diameter portion (47) of the movable body (42) whereby the further movement of the stem (8) upward is blocked. In the state of loosening the setscrews (45), the handle (41) is rotated, whereby the stem vertical movement amount (the upper limit value of the upward movement amount of the stem (8)) may be set to desired value B' (smaller value as compared with the case as shown in FIG. 2, for example) as shown in FIG. 3.

Here, the magnitudes of stem vertical movement amounts B and B' are set to a magnitude not greater than stem vertical movement amount A. In the setting, first, as factory defaults of the fluid controller (1), stem vertical movement amount A is set to a maximum value at which the durability of the valve may be secured at a high durability level, regardless of the working condition and the required flow rate. Then, stem vertical movement amount B or B' is set in consideration of the working condition and the required flow rate.

A user of the fluid controller (1) needs to adjust the stem vertical movement amount for the purpose of matching the Cv value for each gas line used. At this time, stem vertical movement amount A is not changed, and stem vertical movement amount B or B' is to be adjusted. By this, accurate adjustment of the Cv value may be performed in the state where the durability does not decrease beyond the set value. Pitches of the male screw portion (46b) of the movable body (42) and the female screw portion (41b) of the handle (41) are 0.5-0.75, for example, for facilitating the adjustment.

As described above, because adjustment of stem vertical movement amount B or B' by the stem vertical-movement-amount adjustment means (11) is performed by converting the rotation of the handle (41) into the vertical movement of the movable body (42), there is no possibility of the loosening of the screw portions or no possibility of the generation of the torsional stress applied to the bellows and the like, as compared with the case of adjusting the stem vertical movement amount by the rotation of the movable body. As a result, reduction of the accuracy, which is caused by the loosening of the screw portion, and reduction of the durability, which is caused by the torsional stress are prevented.

In the above, an air driven direct touch type metal diaphragm valve is described as an example of the fluid controller (1). However, the above-mentioned stem vertical-movement-amount upper-limit-value setting means (10) and the stem vertical-movement-amount adjustment means (11) are not limited to be applied thereto but may be applied to various valves and the like which need adjustment of the stem vertical movement amount. In the above, the handle is configured to be rotated manually, but may be configured to be rotated automatically.

INDUSTRIAL APPLICABILITY

In accordance with the present invention, the fluid controller which is suitable to be used for adjusting a flow rate by restricting the vertical movement amount of the stem in association with opening and closing operations is capable of preventing reduction of the durability, thereby contributing to improvement of the performance of the fluid controller.

The invention claimed is:

1. A fluid controller comprising:
   a body provided with a fluid channel;
   a casing provided above the body;
   a valve body which opens and closes the fluid channel;
   a stem which moves upward or downward to move the valve body in an open or close direction;
   an actuator which causes the stem to move vertically; and
   a stem vertical-movement-amount adjustment means which adjusts a vertical movement amount of the stem in association with the opening and closing of the fluid channel,
   wherein
   the stem vertical-movement-amount adjustment means comprises:
   a handle rotatably supported by the casing,
   a movable body screwed into an inner periphery of the handle, and
   a handle pressing ring fixed to the casing,
   the movable body is prevented from rotating in relation to the casing and vertical movement of the movable body is enabled,
   the handle is enabled to rotate in relation to the handle pressing ring, and
   the handle pressing ring is received by a flange provided at the handle via a friction reducing member.

2. The fluid controller according to claim 1, wherein
   an upper end portion of a drive shaft of the actuator which is integral with the stem is inserted through a shaft insertion hole of the movable body,
   a flange portion is provided at a portion, of the drive shaft, which is located below the shaft insertion hole, and
   a distance between an upper surface of the flange portion of the drive shaft and a lower surface of the movable body is defined as a stem vertical movement amount.

3. The fluid controller according to claim 1, wherein
   the guide means has:
   a guide groove which is provided on the movable body and which extends vertically; and
   a guide pin which is fixed to the casing and which has a distal end portion fitted into the guide groove.

4. The fluid controller according to claim 1, wherein
   the fluid controller further comprising a stem vertical-movement-amount upper-limit-value setting means which sets the upper limit value of stem vertical movement amount and
   the stem vertical-movement-amount upper-limit-value setting means is constituted by a downward protruding portion of the casing where the male screw portion is provided, a female screw provided on a top wall of a bonnet, and a lock nut.

5. The fluid controller according to claim 1, wherein
   the friction reducing member is a fluororesin coating washer.

6. The fluid controller according to claim 1, wherein
   the handle pressing ring consist of a lower thin portion and an upper thick portion having an outer diameter which is the same as that of the thin portion and having an inner diameter which is smaller than that of the thin portion, wherein
   on the inner periphery of the thin portion, a female screw is provided, at an upper end portion of the thick portion, an annular projecting edge portion which projects radially inward is provided, the handle pressing ring is screwed to a surrounding wall of the casing, and a lower surface of the thick portion is received on an upper surface of a top wall of the casing.

\* \* \* \* \*